(12) United States Patent
Lusted (10) Patent No.: US 8,826,103 B2
(45) Date of Patent: Sep. 2, 2014

(54) TIME PROTOCOL LATENCY CORRECTION BASED ON FORWARD ERROR CORRECTION STATUS

(71) Applicant: Intel Corporation, Santa Clara, CA (US)

(72) Inventor: Kent Lusted, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 13/744,704

(22) Filed: Jan. 18, 2013

(65) Prior Publication Data

US 2014/0208146 A1 Jul. 24, 2014

(51) Int. Cl.
*H03M 13/00* (2006.01)
*G06F 1/12* (2006.01)

(52) U.S. Cl.
CPC ........................................ *G06F 1/12* (2013.01)
USPC ........................................... 714/774; 714/776

(58) Field of Classification Search
CPC ........... H04L 1/00; H04L 29/06; H03M 13/35
USPC ................................................. 714/774, 776
See application file for complete search history.

(56) References Cited

U.S. PATENT DOCUMENTS

| | | | |
|---|---|---|---|
| 7,151,749 B2* | 12/2006 | Vega-Garcia et al. | 370/241.1 |
| 8,369,705 B2* | 2/2013 | de Lind Van Wijngaarden | 398/70 |
| 8,412,051 B2* | 4/2013 | El-Ahmadi et al. | 398/135 |

* cited by examiner

*Primary Examiner* — Esaw Abraham
(74) *Attorney, Agent, or Firm* — Grossman, Tucker, Perreault & Pfleger, PLLC (57) ABSTRACT

One embodiment provides a method for time protocol latency correction based on forward error correction (FEC) status. The method includes determining, by a network node element, if a forward error correction (FEC) decoding mode is enabled or disabled for a packet received from a link partner in communication with the network node element. The method also includes determining, by the network node element, a first time correction factor if an FEC decoding mode is enabled, the first time correction factor includes a time delay associated with the enabled FEC decoding mode and the first time correction factor is applied to a time stamp associated with the packet. The method also includes determining, by the network node element, a second time correction factor if an FEC decoding mode is disabled, the second time correction factor is applied to the time stamp associated with the packet.

30 Claims, 4 Drawing Sheets

TIME PROTOCOL LATENCY CORRECTION BASED ON FORWARD ERROR CORRECTION STATUS

FIELD

The present disclosure relates to a network system configured to correct time protocol latency based on forward error correction status.

BACKGROUND

Some conventional Ethernet network systems support optional Forward Error Correction (FEC) protocols as an additional measure of packet integrity, which may be useful on channels having marginal quality. FEC protocols are processor intensive, and enabling FEC protocols typically degrades system performance and increases latency and the overall power demand of a network node. In the conventional Ethernet approach, a node's receiver may choose to leave the FEC decoder off until channel quality is sufficiently poor that the decoder must be enabled or leave the FEC decoder on until the channel quality is sufficiently good. The change in latency overhead associated with the enablement or disablement of a FEC decoding scheme is not accounted for when synchronizing precision clocks between node elements. Thus, clock synchronization may become impossible, or at least, beyond tolerable limits for certain applications that require very precise clock synchronization.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Figure 1:
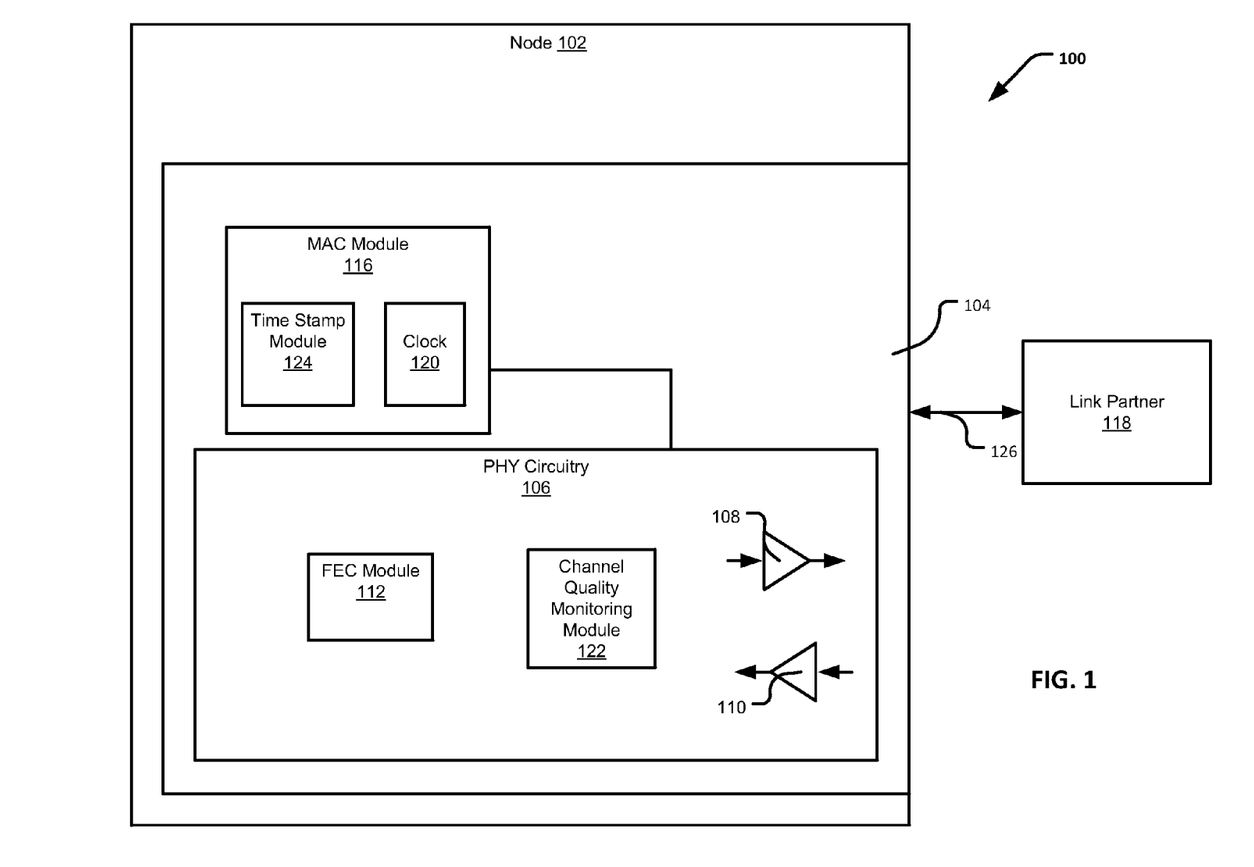
FIG. 1 illustrates a network system consistent with various embodiments of the present disclosure.

FIG. 1 illustrates a network system 100 consistent with various embodiments of the present disclosure. Network system 100 generally includes at least one network node element 102 and at least one link partner 118, each configured to communicate with one another via communications link 126. The network node element 102 and the link partner 118 may communicate with each other, via link 126, using an Ethernet communications protocol. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard, for example, the IEEE 802.3 Standard, published 2008. The link partner 118 and/or node element 102 may represent a computer node element (e.g., host server system), switch, router, hub, network storage device, network attached device, non-volatile memory (NVM) storage device, etc. The link partner 118 may be configured and operate in a similar manner as the node 102, as described in greater detail below.

Node 102 generally includes a network controller 104 configured to communicate with the link partner 118 using the aforementioned Ethernet communications protocol. Network controller 104 is also generally configured to perform various operations in a defined order when a link is first established with the link partner 118 (e.g., upon system initialization, establishing a new link with the link partner, etc.). Such operations may include, for example, an auto-negotiation period during which various capabilities of the node 102 and the link partner 118 are exchanged, followed by a link training period during which the quality of the communications link 126 may be determined, followed by a link up state, or data mode, when data frames/packets are exchanged between the node 102 and link partner 118. The auto-negotiation period, link training period and data mode period may be defined under the aforementioned IEEE 802.3 communications protocol.

The network controller 104 includes PHY circuitry 106 generally configured to interface the node 102 with the link partner 118, via communications link 126. PHY circuitry 106 may comply or be compatible with, the aforementioned IEEE 802.3 Ethernet communications protocol, which may include, for example, 10GBASE-KR, 40GBASE-KR4, 40GBASE-CR4, 100GBASE-CR10, 100GBASE-CR4, 100GBASE-KR4, and/or 100GBASE-KP4 and/or other PHY circuitry that is compliant with the aforementioned IEEE 802.3 Ethernet communications protocol and/or compliant with an after-developed communications protocol. PHY circuitry 106 includes transmit circuitry (Tx) 108 configured to transmit data packets and/or frames to the link partner 118, via link 126, and receive circuitry (Rx) 110 configured to receive data packets and/or frames from the link partner 118, via link 126. Of course, PHY circuitry 106 may also include encoding/decoding circuitry (not shown) configured to perform analog-to-digital and digital-to-analog conversion, encoding and decoding of data, analog parasitic cancellation (for example, cross talk cancellation), and recovery of received data. Rx circuitry 110 may include phase lock loop circuitry (PLL, not shown) configured to coordinate timing of data reception from the link partner 118. The communications link 126 may comprise, for example, a media dependent interface that may include, for example, copper twin-axial cable, backplane traces on a printed circuit board, etc. In some embodiments, the communications link 126 may include a plurality of logical and/or physical channels (e.g., differential pair channels) that provide separate connections between, for example, the Tx and Rx 108/110 of the node 102 and an Rx and Tx, respectively, of the link partner 118.

Network controller 104 also includes a forward error correction (FEC) module 112 configured to perform forward error correction operations on packets sent and/or received by the network controller 104. In general, according to the aforementioned IEEE 802.3 Ethernet communications protocol (such as Clause 91), FEC operations include encoding a data stream into an FEC frame (e.g. computation and inclusion of parity check symbols in the FEC encoded frame), and decoding of a received data stream by performing a data integrity check (e.g., recomputation of parity on received FEC frame and comparing against received parity symbols) and error correction, etc. FEC is generally employed when the quality of the communications link 126 is below a threshold (e.g., a bit error bit error ratio (BER) threshold, etc.), and may be utilized in addition to other integrity checks that may be performed on a packet-by-packet basis (e.g., CRC, hash, etc.). The FEC module 112 may be configured to perform a plurality of FEC operations that may include a plurality of FEC encoding and decoding protocols or modes, as may be defined by the aforementioned IEEE 802.3 Ethernet communications protocol. For example, the FEC module 112 may be configured to perform encoding and/or decoding operations of a "light" FEC mode in which the error correction (coding/decoding gain) and latency are set to a minimal or low threshold. As another example, the FEC module 112 may be configured to perform encoding and/or decoding operations of a "heavy" FEC mode in which the coding/decoding gain is set to a maximal or high threshold. The "light" FEC mode may generally offer reduced processing burden and less error correction and detection (and hence, may offer lower latency and power consumption) over the "heavy" FEC mode, at the possible expense of increased packet errors. As another example, the FEC module 112 may contain multiple FEC encoding/decoding modes and may be configured to operate with appropriate FEC mode encoding and/or decoding that is optimized for a given medium (e.g. backplane copper traces or copper twin-axial cables) used for the communication link 126. FEC uses the coding gain to increase the link budget and BER performance on a given channel. The link budget consists of the electrical parameters which define the link 126, such as insertion loss, return loss, pulse response, etc. In general, there are tradeoffs for selecting an FEC mode such as latency, power, error correction and detection capability, ease of implementation, etc. A "heavy" FEC mode is generally capable of more error correction and detection than a "light" mode at the expense of power, latency and ease of implementation. Thus, the terms "light" and "heavy" as used herein in the context of FEC means the amount of coding gain that may be applied, and these terms are used to indicate that the amount of coding gain may be relative and may be selected for a given operating environment. The amount of coding/decoding gain of the FEC mode could be selected to meet the minimum link budget and BER performance for a given medium and/or application.

Network controller 104 also includes a channel quality measuring module 122 configured to determine at least one channel quality parameter of at least one channel of the communications link 126. Examples of channel quality parameters include: bit error ratio (BER), signal-to-noise ratio (SNR), cross talk, environmental noise, linearity, impulse response, etc. Custom and/or predefined techniques may be used to provide an analysis of the quality of a received signal on a given channel. For example, the channel quality measuring module 122 may be configured to generate an "eye test" template to determine if test signals received the Rx circuitry are of sufficient quality. As another example, the channel quality measuring module 122 may be configured to generate on/off sequences of the Tx circuitry and determine channel crosstalk parameters. In yet another example, the channel quality measuring module 122 may be configured to obtain information from attached medium, such as non-volatile storage media or mass storage media. In still another example, the channel quality measuring module 122 may be configured to perform a time domain reflectrometry (TDR) test to determine signal reflectivity on a given channel between the node 102 and link partner 118. Of course, these are only examples of the techniques that may be used to provide an analysis of the link quality, and these techniques and/or other defined and/or custom/proprietary techniques may be used by the channel quality measuring module 122. Selection of one or more such techniques may be based on, for example, the network system environment, the specified PHY circuitry, known channel quality limitations, etc.

During operation, the module 122 may determine at least one channel quality parameter for at least one channel of the link 126. The at least one channel quality parameter may indicate a change in FEC state may improve either packet flow speed or data integrity. For example, if a packet from the link partner 118 is encoded with an FEC mode, the module 122 may generate a channel quality parameter that indicates that the channel quality is of sufficient quality such that no FEC decoding is necessary or that a faster FEC decoding may be used instead of the FEC mode specified in the packet (e.g., "light" FEC decoding mode instead of a "heavy" FEC decoding mode). This determination may operate to improve bandwidth, and may be based on a determination that changing to a "lighter" FEC mode will keep packet integrity within tolerable limits. Thus, the module 112 provides for enabling or disabling an FEC mode for received packets, based on, at least in part a channel quality parameter generated by the module 122.

Network controller 104 also includes a media access control (MAC) module 116 configured to provide addressing and channel access control protocols for communication with the link partner 118, as may be defined by the aforementioned Ethernet communications protocol (e.g., MAC module 116 may be a Layer 2 device). The MAC module 116 defines a medium independent method of transmitting and receiving data. While the PHY circuitry 106 is generally unique to the medium (e.g., the copper cable or the backplane), the MAC module 116 may operate independent of the type of medium that is connected. The MAC module 116 may be configured for data encapsulation (transmit and receive), framing (frame boundary delimitation, frame synchronization), addressing (handling of source and destination addresses), and error detection (detection of physical medium transmission errors). Of course, other operations and features of the MAC module 116 may be defined by the aforementioned Ethernet communications protocol.

The network controller 104 also includes clock circuitry 120 generally configured to provide a local clock reference for packet communications. The clock circuitry 120 may include hardware clock circuitry and/or "virtual" clock circuitry such as a "software" clock executed in a memory (not shown). Of course, link partner 118 may also include clock circuitry (not shown), and the clock circuitry 122 associated with node 102 may be referred to herein as the "local clock" and the clock circuitry associated with the link partner 118 may be referred to herein as the "remote clock."

The network controller 104 also includes time stamp module 124 that is configured to modify at least one packet with a time stamp, based on, at least in part, a time value given by the local clock 120. Packet reception through the various systems within the network controller 104 and/or node 102 may cause latency between a time stamp and an actual time. For example, when packet is received, the time stamp module 124 may apply a time stamp to the packet, but there may be a latency associated with various additional operations of the receive path of the network controller 104 and/or PHY circuitry 106. Thus, when a packet is received by Rx circuitry 110 (from link partner 118), processed by the receive path of the PHY circuitry 106 and delivered to the MAC module 116, the time stamp generated by the link partner 118 may be inaccurate because of a delay in the receive path of the PHY circuitry 106. Because of these inaccuracies, synchronization between the local clock 120 and the remote clock (not shown in this figure) may be impossible or too inaccurate to be used with certain applications. The network controller 104 and link partner 118 may each be capable of synchronizing their respective clocks, so that, for example, time delays caused by particular PHY circuitry, network controller, and/or other system-level time delays in packet transmission and reception may be corrected, as may be desirable and/or required for certain applications (e.g., sound applications, video conferencing applications, financial market applications, industrial automation, safety systems, etc.) In some embodiments, the network controller 104 and link partner may be configured to synchronize clocks based on the IEEE 1588 TimeSync Protocol, which may comply or be compatible with the clock synchronization standard published by the Institute of Electrical and Electronics Engineers (IEEE) titled "IEEE Standard for a Precision Clock Synchronization Protocol for Networked Measurement and Control System", published in July, 2008 and/or later and/or earlier versions of this standard.

Accordingly, in the present disclosure, the time stamp module 124 may be configured to modify a time stamp with a time correction factor to account for transmission and reception delays due to particular PHY circuitry, etc. For example, when the MAC module 116 has a packet ready for transmission, the time stamp module 124 is configured to apply a local time stamp to the packet (based on a time value given by the clock circuitry 120), where the local time stamp includes a correction factor that will add to the time value generated by the clock circuitry 120, to account for the time taken by the packet as it is processed through the PHY circuitry 106 before it is actually transmitted by Tx circuitry 108 to the link 126. The correction factor may be based on, for example, the particulars of the PHY circuitry 106 (e.g., PHY speed, manufacturer's specifications, etc.), etc. Similarly, when a packet is received by the Rx circuitry 108 from link partner 118, the packet may include a remote time stamp generated by the link partner 118. A time delay may occur as the packet is processed by the PHY circuitry 106 and delivered to the MAC module 116. The time stamp module 124 may apply a local time stamp to the packet, where the local time stamp includes a correction factor to account for the time taken by the packet as it is processed through the PHY circuitry 106 before the packet is delivered to the MAC module 116. Typically, the difference in between the local and remote time stamps represents the difference between the local clock and the remote clock, respectively.

However, the conventional network system using the IEEE 1588 TimeSync protocol is agnostic to the FEC state of the network controller. The conventional network system generally relies on a fixed latency associated with a particular PHY circuitry, and thus, the conventional network system does not provide a mechanism to adjust a latency time based on whether an FEC decoder mode is enabled or disabled. In the present disclosure, as described above, an FEC decoder mode may be enabled or disabled based on, at least in part, a channel quality parameter. However, the conventional network system, always assumes a fixed latency for FEC decoding and thus, if a packet is received that is encoded with an FEC mode, a latency is automatically added that includes FEC decoding even if FEC decoding is disabled. Thus, clock synchronization between the node 102 and link partner 118 may be inaccurate based on the state of FEC decoding. For example, if the network controller determines no FEC decoding is necessary (or that a "faster" decoding scheme is sufficient), the conventional network system is incapable of accounting for the variable time delays that may be caused by such a determination. Accordingly, the teachings of the present disclosure provide a time stamp module 124 that is configured to determine the time correction factor based on the current FEC decoding mode being used by the PHY circuitry 106 (in addition to delays caused by the PHY circuitry 106, described above). As described above, the FEC module 112 may enable or disable an FEC mode based on a channel quality parameter, even if a received packet has been encoded with an FEC mode by the link partner 118.

For example, in operation, if the FEC module 112 determines that the link 126 has a quality (based on a channel quality parameter generated by module 122) such that FEC decoding is necessary for packet integrity, the time stamp module 124 may determine a first correction factor. The first time correction factor may be based on receive path delay characteristics (e.g., PHY speed/type characteristics, system characteristics, etc.) as described above, and also based on a delay caused by the processing overhead of an enabled FEC decoding mode. If the FEC module 112 determines that the link 126 is of sufficient quality decoding (based on a channel quality parameter generated by module 122) to disable FEC decoding for received packets, the time stamp module 124 may determine a second time correction factor. The second time correction factor may be based on receive path delay characteristics (e.g., PHY speed/type characteristics, system characteristics, etc.), as described above, without including a delay time for FEC decoding. As a general matter, different FEC decoding modes may cause different delay times. For example, a "light" FEC decoding mode may cause less of a delay than a "heavy" FEC decoding mode.

Figure 2:
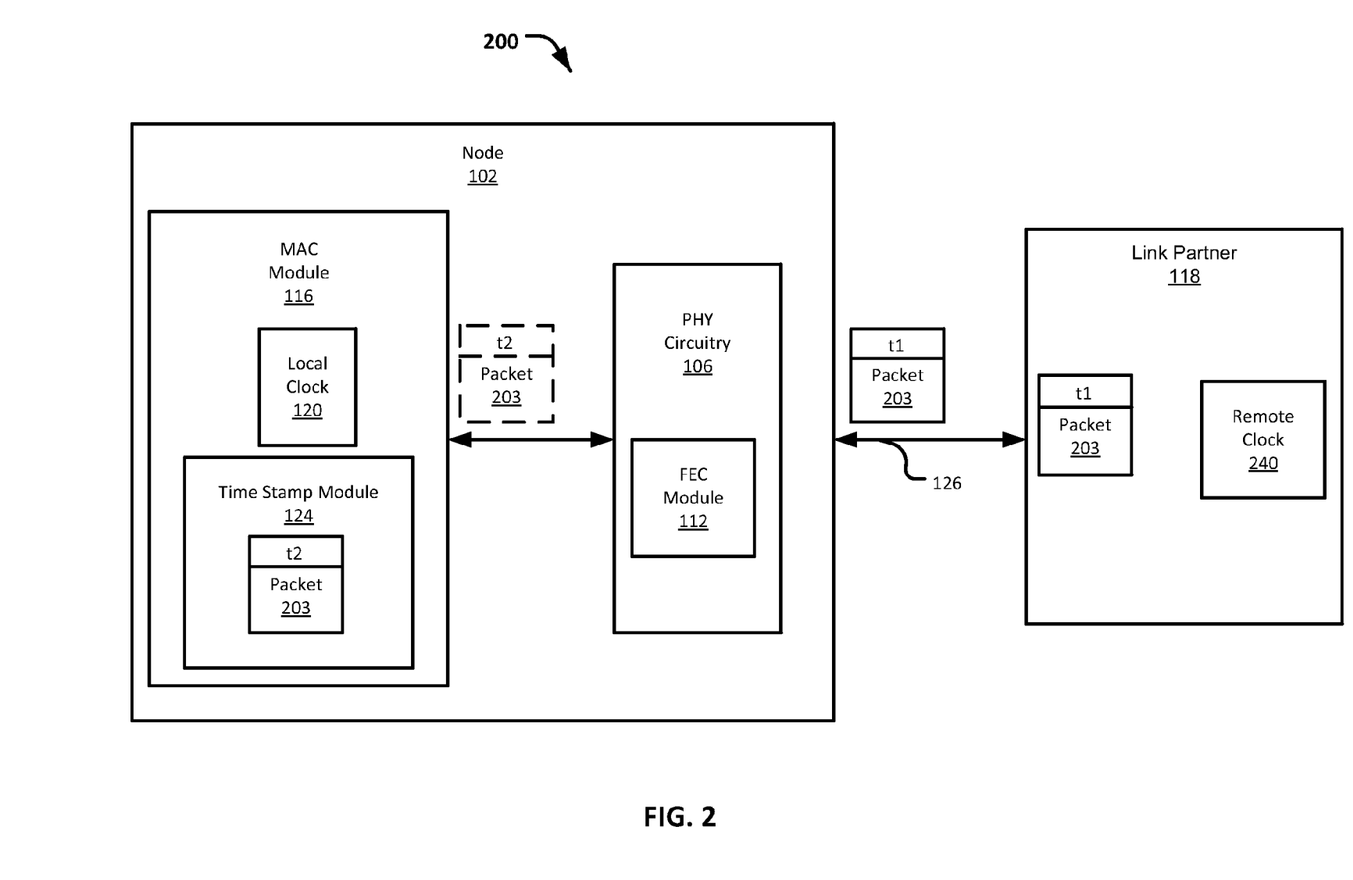
FIG. 2 illustrates an example of packet flow and time stamping procedures according to one embodiment of the present disclosure.

FIG. 2 illustrates an example of packet flow and time stamping procedures 200 according to one embodiment of the present disclosure. In FIG. 2, certain portions of the system 100 depicted in FIG. 1 have been omitted for clarity, but it is to be understood that like parts of FIG. 2 can be implemented in a manner consistent with an embodiment depicted in FIG. 1, or alternatively in other system implementations, without departing from this embodiment. In the example 200 of FIG. 2, a packet 203 is generated at the link partner 118. The packet includes a time stamp value of t1 applied by the link partner 118. The value of t1 represents the time when the packet is ready to be transmitted to the node 102 via the link 126. The value of t1 may be based on the time value of the remote clock 240, and may include an additional delay caused by processing of the link partner (e.g., PHY circuitry processing (not shown), etc.) and an additional delay caused by FEC encoding, if such encoding is enabled by the link partner 118.

The packet is transmitted to the node 102, via link 126, and received by PHY circuitry 106. Processing through the PHY circuitry 106 causes a delay in the packet transmission flow, and this delay is represented by time value t2 in the packet 203. The packet is transmitted to the MAC module 116, and the time stamp module 124 applies a time stamp value of t2 to the packet 203. The time stamp value of t2 may be based on the time value of the local clock 120, and delays caused by processing through the PHY circuitry 106 (including FEC decoding by the FEC module 112). In this example, t2=t1+X; where X is the time correction factor that may include a delay caused by FEC decoding associated with a selected FEC decoding mode. If the node 102 determines that an FEC decoding mode should be enabled, based on a determination of at least one channel quality parameter of the link 126, then the value of X may be represented by X=Y+Z; where Y is the time delay caused by processing the packet 203 through the PHY circuitry 106 without FEC decoding, and Z is the delay time caused by a selected FEC decoding mode. As noted above, the time delay value Z may change depending the FEC decoding mode enabled by the node 102. For example, the time delay value Z may be less for a "light" FEC decoding mode than for a "heavy" FEC decoding mode. If the node 102 determines that an FEC decoding mode is not necessary, based on a determination of at least one channel quality parameter of the link 126, then the value of X may be represented by X=Y; where Y is the time delay caused by processing the packet 203 through the PHY circuitry 106 without FEC decoding. Thus, the time stamp module 124 is configured to apply different time stamps to the packet, depending on whether an FEC decoding mode is enabled. The time difference between t1 and t2 represents the difference between the remote clock 240 and the local clock 120. The node 102 may be configured to utilize this time difference to synchronize the local clock 120 to the remote clock 240 and/or applying an offset to packet flows associated with the determined time delay.

Figure 3:
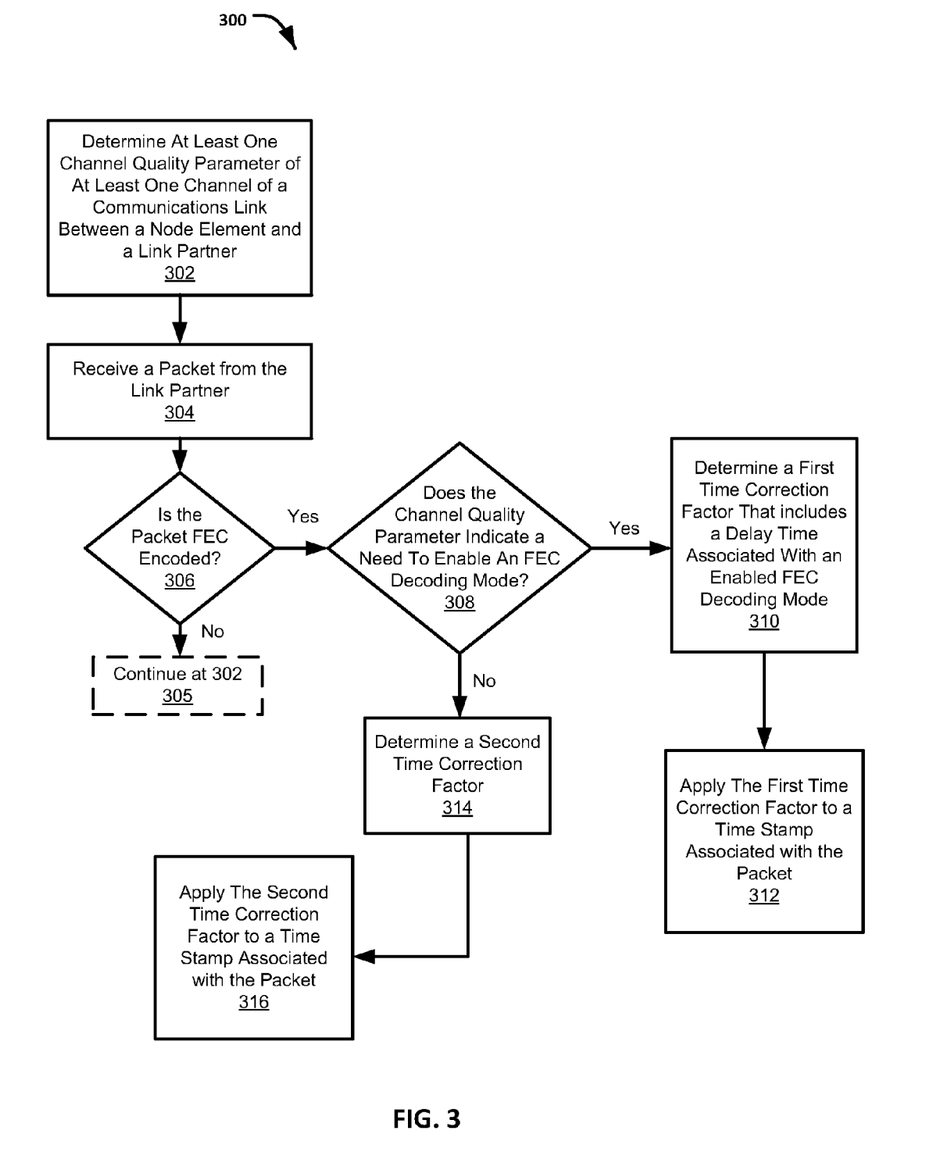
FIG. 3 is a flowchart of operations according to another embodiment of the present disclosure.

FIG. 3 is a flowchart of operations 300 according to another embodiment of the present disclosure. In particular, the flowchart 300 illustrates one example embodiment of operations of a node element when a packet is received from a link partner. Operations of this embodiment include determining at least one channel quality parameter of at least one channel of a communications link between a network node element and a link partner 302. Operations may also include receiving a packet from the link partner 304. Operations may also include determining if the at least one channel quality parameter indicates a need to enable an FEC decoding mode 306. If an FEC mode is enabled, operations may also include determining a first time correction factor that includes a delay time associated with the enabled FEC decoding mode 308. Operations may also include applying the first time correction factor to a time stamp associated with the packet 310. The value of the time correction factor may be based on, at least in part, a delay caused by the selected FEC decoding mode. If an FEC decoding mode is disabled, operations may also include determining a second time correction factor 312. The second time correction factor may be based on, at least in part, processing overhead delays caused by the node element when a packet is received, without regard for a delay caused by FEC decoding. Operations may also include applying the second time correction factor to a time stamp associated with the packet 314.

Figure 4:
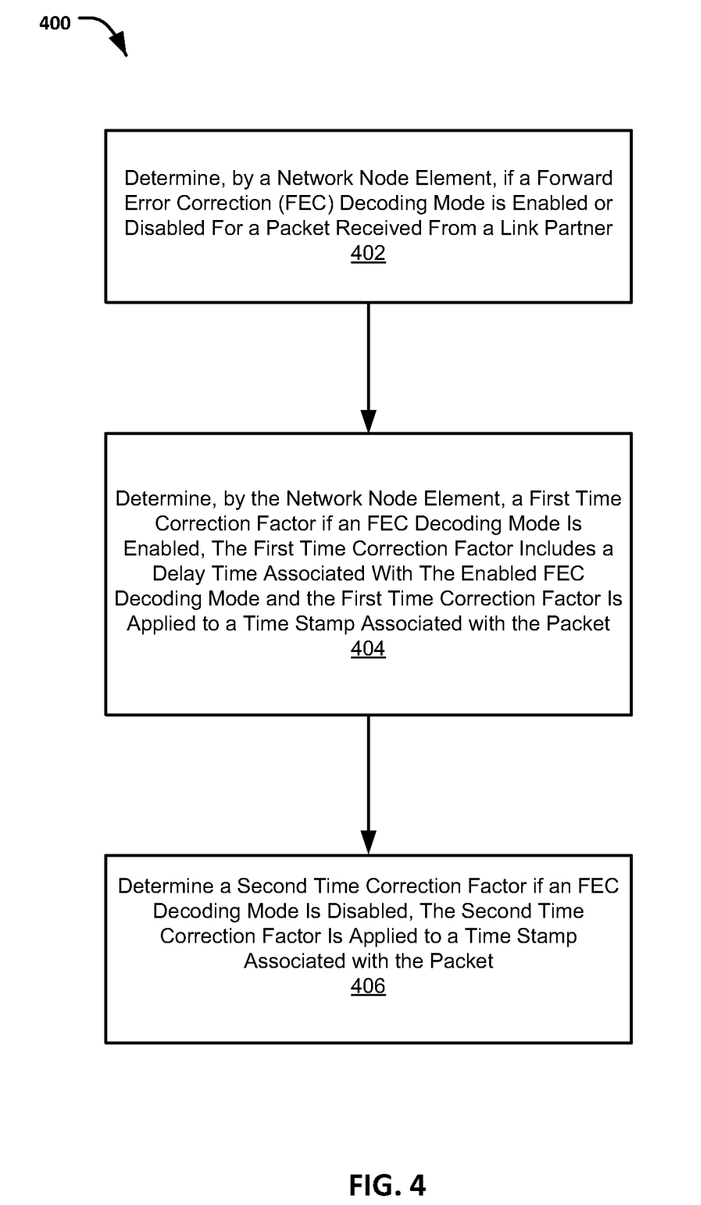
FIG. 4 is a flowchart of operations according to another embodiment of the present disclosure.

FIG. 4 is a flowchart of operations 400 according to another embodiment of the present disclosure. Operations of this embodiment include determining, by a network node element, if a forward error correction (FEC) decoding mode is enabled or disabled for a packet received from a link partner in communication with the network node element 402. Operations according to this embodiment also include determining, by the network node element, a first time correction factor if an FEC decoding mode is enabled 404. The first time correction factor includes a delay time associated with the enabled FEC decoding mode and the first time correction factor is applied to a time stamp associated with the packet. Operations of this embodiment may also include determining a second time correction factor if an FEC decoding mode is disabled 406. The second time correction factor is applied to a time stamp associated with the packet.

While the flowcharts of FIGS. 3 and 4 illustrate operations according various embodiments, it is to be understood that not all of the operations depicted in FIGS. 3 and/or 4 are necessary for other embodiments. In addition, it is fully contemplated herein that in other embodiments of the present disclosure, the operations depicted in FIGS. 3 and/or 4, and/or other operations described herein may be combined in a manner not specifically shown in any of the drawings, and such embodiments may include less or more operations than are illustrated in FIGS. 3 and/or 4. Thus, claims directed to features and/or operations that are not exactly shown in one drawing are deemed within the scope and content of the present disclosure.

The foregoing is prided as exemplary system architectures and methodologies, modifications to the present disclosure are possible. For example, node 102 and/or link partner 118 may also include a host processor, chipset circuitry and system memory. The host processor may include one or more processor cores and may be configured to execute system software. System software may include, for example, operating system code (e.g., OS kernel code) and local area network (LAN) driver code. LAN driver code may be configured to control, at least in part, the operation of the network controller 104. System memory may include I/O memory buffers configured to store one or more data packets that are to be transmitted by, or received by, network controller 104. Chipset circuitry may generally include "North Bridge" circuitry (not shown) to control communication between the processor, network controller 104 and system memory.

In some embodiments, the network controller 104 may be a network interface card (NIC) coupled to the node 102 via a bus (not shown). The bus may comprise a bus that complies with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, the bus instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, the bus may comprise other types and configurations of bus systems, without departing from this embodiment.

Node 102 and/or link partner 118 may further include an operating system (OS, not shown) to manage system resources and control tasks that are run on, e.g., node 102. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated sub-system such as, for example, a TCP offload engine and/or network controller 104. The TCP offload engine circuitry may be configured to provide, for example, packet transport, packet segmentation, packet reassembly, error checking, transmission acknowledgements, transmission retries, etc., without the need for host CPU and/or software involvement. The TCP offload engine may be included with, or form part of, the network controller 104 embodied as a NIC.

The system memory may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more storage mediums having stored thereon, individually or in combination, instructions that when executed by one or more processors perform the methods. The processor may include, for example, a processing unit and/or programmable circuitry in the network controller 104 and/or other processing unit or programmable circuitry. Thus, it is intended that operations according to the methods described herein may be distributed across a plurality of physical devices, such as processing structures at several different physical locations. The storage medium may include any type of tangible, non-transitory storage medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage media suitable for storing electronic instructions.

In some embodiments, a hardware description language may be used to specify circuit and/or logic implementation for the various modules and/or circuitry described herein. For example, in one embodiment the hardware description language may comply or be compatible with a very high speed integrated circuits (VHSIC) hardware description language (VHDL) that may enable semiconductor fabrication of one or more circuits and/or modules described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

"Circuitry", as used in any embodiment herein, may comprise, for example, singly or in any combination, hardwired circuitry, programmable circuitry, state machine circuitry, and/or firmware that stores instructions executed by programmable circuitry. "Module", as used herein, may comprise, singly or in any combination, circuitry and/or code and/or instructions sets (e.g., software, firmware, etc.).

Accordingly, the present disclosure provides an example network node element that includes a network controller configured to communicate with a link partner using an Ethernet communications protocol. The network controller is further configured to determine if a forward error correction (FEC) decoding mode is enabled or disabled for a packet received from the link partner; determine a first time correction factor if an FEC decoding mode is enabled, the first time correction factor includes a time delay associated with the enabled FEC decoding mode and the first time correction factor is applied to a time stamp associated with the packet; and determine a second time correction factor if an FEC decoding mode is disabled, the second time correction factor is applied to the time stamp associated with the packet.

The present disclosure also provides a system that includes one or more storage mediums having stored thereon, individually or in combination, instructions that when executed by one or more processors result in the following operations including: determine if a forward error correction (FEC) decoding mode is enabled or disabled for a packet received from a link partner in communication with a network node element; determine a first time correction factor if an FEC decoding mode is enabled, the first time correction factor includes a time delay associated with the enabled FEC decoding mode and the first time correction factor is applied to a time stamp associated with the packet; and determine a second time correction factor if an FEC decoding mode is disabled, the second time correction factor is applied to the time stamp associated with the packet.

The present disclosure also provides a method for time protocol latency correction based on forward error correction (FEC) status. The method includes determining, by a network node element, if a forward error correction (FEC) decoding mode is enabled or disabled for a packet received from a link partner in communication with the network node element; determining, by the network node element, a first time correction factor if an FEC decoding mode is enabled, the first time correction factor includes a time delay associated with the enabled FEC decoding mode and the first time correction factor is applied to a time stamp associated with the packet; and determining, by the network node element, a second time correction factor if an FEC decoding mode is disabled, the second time correction factor is applied to the time stamp associated with the packet.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A network node element, comprising:
a network controller configured to communicate with a link partner using an Ethernet communications protocol; the network controller further configured to:
determine if a forward error correction (FEC) decoding mode is enabled or disabled for a packet received from the link partner;
determine a first time correction factor if an FEC decoding mode is enabled, the first time correction factor includes a time delay associated with the enabled FEC decoding mode and the first time correction factor is applied to a time stamp associated with the packet; and
determine a second time correction factor if an FEC decoding mode is disabled, the second time correction factor is applied to the time stamp associated with the packet.

2. The network node element of claim 1, wherein the network controller is further configured to determine at least one channel quality parameter of at least one channel of a communication link between the network controller and the link partner; and
determine whether to enable or disable the FEC decoding mode for use by the network node element based on, at least in part, the at least one channel quality parameter.

3. The network node element of claim 2, wherein the channel quality parameter is selected from the group of a bit error rate (BER), signal-to-noise ratio (SNR), cross talk, environmental noise, linearity or impulse response.

4. The network node element of claim 1, wherein the network controller is further configured to determine if the packet received from the link partner is encoded, by the link partner, using at least one forward error correction (FEC) mode.

5. The network node element of claim 1, wherein the network controller comprises physical interface (PHY) circuitry, and wherein the first and second time correction factors are based on, at least in part, a delay caused by processing of the packet by the PHY circuitry.

6. The network node element of claim 1, further comprising a local clock, wherein the time stamp is based on a time value of the local clock plus the first or second time correction factor.

7. A method for time protocol latency correction based on forward error correction (FEC) status, comprising:
   determining, by a network node element, if a forward error correction (FEC) decoding mode is enabled or disabled for a packet received from a link partner in communication with the network node element;
   determining, by the network node element, a first time correction factor if an FEC decoding mode is enabled, the first time correction factor includes a time delay associated with the enabled FEC decoding mode and the first time correction factor is applied to a time stamp associated with the packet; and
   determining, by the network node element, a second time correction factor if an FEC decoding mode is disabled, the second time correction factor is applied to the time stamp associated with the packet.

8. The method of claim 7, further comprising:
   determining at least one channel quality parameter of at least one channel of a communication link between the network controller and the link partner; and
   determining whether to enable or disable the FEC decoding mode for use by the network node element based on, at least in part, the at least one channel quality parameter.

9. The method of claim 8, wherein the channel quality parameter is selected from the group of a bit error rate (BER), signal-to-noise ratio (SNR), cross talk, environmental noise, linearity or impulse response.

10. The method of claim 7, further comprising:
    determining if the packet received from the link partner is encoded, by the link partner, using at least one forward error correction (FEC) mode.

11. The method of claim 7, wherein the network node element comprises physical interface (PHY) circuitry, and wherein the first and second time correction factors are based on, at least in part, a delay caused by processing of the packet by the PHY circuitry.

12. The method of claim 7, wherein the network node element comprises a local clock, wherein the time stamp is based on a time value of the local clock plus the first or second time correction factor.

13. A system comprising, one or more tangible, non-transitory storage mediums having stored thereon, individually or in combination, instructions that when executed by one or more processors result in the following operations comprising:
    determine if a forward error correction (FEC) decoding mode is enabled or disabled for a packet received from a link partner in communication with a network node element;
    determine a first time correction factor if an FEC decoding mode is enabled, the first time correction factor includes a time delay associated with the enabled FEC decoding mode and the first time correction factor is applied to a time stamp associated with the packet; and
    determine a second time correction factor if an FEC decoding mode is disabled, the second time correction factor is applied to the time stamp associated with the packet.

14. The system of claim 13, wherein the instructions that when executed by one or more processors results in the following additional operations comprising determine at least one channel quality parameter of at least one channel of a communication link between the network controller and the link partner; and
    determine whether to enable or disable the FEC decoding mode for use by the network node element based on, at least in part, the at least one channel quality parameter.

15. The system of claim 14, wherein the channel quality parameter is selected from the group of a bit error rate (BER), signal-to-noise ratio (SNR), cross talk, environmental noise, linearity or impulse response.

16. The system of claim 13, wherein the instructions that when executed by one or more processors results in the following additional operations comprising determine if the packet received from the link partner is encoded, by the link partner, using at least one forward error correction (FEC) mode.

17. The system of claim 13, wherein the instructions that when executed by one or more processors results in the following additional operations comprising determine a delay time caused by processing of the packet by physical interface (PHY) circuitry associated with the network node element; and wherein the first and second time correction factors are based on, at least in part, a delay caused by processing of the packet by the PHY circuitry.

18. The system of claim 13, wherein the instructions that when executed by one or more processors results in the following additional operations comprising determine a time value of a local clock associated with the network node element; and wherein the time stamp is based on a time value of the local clock plus the first or second time correction factor.

19. A network node element, comprising:
    a network interface card configured to be coupled to a bus, the network interface card is configured to communicate with a link partner using an Ethernet communications protocol; the network interface card is further configured to:
    determine if a forward error correction (FEC) decoding mode is enabled or disabled for a packet received from the link partner;
    determine a first time correction factor if an FEC decoding mode is enabled, the first time correction factor includes a time delay associated with the enabled FEC decoding mode and the first time correction factor is applied to a time stamp associated with the packet; and
    determine a second time correction factor if an FEC decoding mode is disabled, the second time correction factor is applied to the time stamp associated with the packet.

20. The network node element of claim 19, wherein the network interface card is further configured to determine at least one channel quality parameter of at least one channel of a communication link between the network controller and the link partner; and
    determine whether to enable or disable the FEC decoding mode for use by the network node element based on, at least in part, the at least one channel quality parameter.

21. The network node element of claim 20, wherein the channel quality parameter is selected from the group of a bit error rate (BER), signal-to-noise ratio (SNR), cross talk, environmental noise, linearity or impulse response.

22. The network node element of claim 19, wherein the network interface card is further configured to determine if the packet received from the link partner is encoded, by the link partner, using at least one forward error correction (FEC) mode.

23. The network node element of claim 19, wherein the network interface card comprises physical interface (PHY) circuitry, and wherein the first and second time correction factors are based on, at least in part, a delay caused by processing of the packet by the PHY circuitry.

24. The network node element of claim 19, further comprising a local clock, wherein the time stamp is based on a time value of the local clock plus the first or second time correction factor.

25. A computer-readable program product comprising, one or more tangible, non-transitory storage mediums having stored thereon, individually or in combination, hardware descriptive language instructions that, when executed by one or more processors, specifies circuitry that is configured to perform the following operations comprising:
   determine if a forward error correction (FEC) decoding mode is enabled or disabled for a packet received from a link partner in communication with a network node element;
   determine a first time correction factor if an FEC decoding mode is enabled, the first time correction factor includes a time delay associated with the enabled FEC decoding mode and the first time correction factor is applied to a time stamp associated with the packet; and
   determine a second time correction factor if an FEC decoding mode is disabled, the second time correction factor is applied to the time stamp associated with the packet.

26. The computer-readable program product of claim 25, wherein the instructions that when executed by one or more processors specifies circuitry that is configured to perform the following additional operations comprising:
   determine at least one channel quality parameter of at least one channel of a communication link between the network controller and the link partner; and
   determine whether to enable or disable the FEC decoding mode for use by the network node element based on, at least in part, the at least one channel quality parameter.

27. The computer-readable program product of claim 26, wherein the channel quality parameter is selected from the group of a bit error rate (BER), signal-to-noise ratio (SNR), cross talk, environmental noise, linearity or impulse response.

28. The computer-readable program product of claim 25, wherein the instructions that when executed by one or more processors specifies circuitry that is configured to perform the following additional operations comprising:
   determine if the packet received from the link partner is encoded, by the link partner, using at least one forward error correction (FEC) mode.

29. The computer-readable program product of claim 25, wherein the instructions that when executed by one or more processors specifies circuitry that is configured to perform the following additional operations comprising:
   determine a delay time caused by processing of the packet by physical interface (PHY) circuitry associated with the network node element; and wherein the first and second time correction factors are based on, at least in part, a delay caused by processing of the packet by the PHY circuitry.

30. The computer-readable program product of claim 23, wherein the instructions that when executed by one or more processors specifies circuitry that is configured to perform the following additional operations comprising:
   determine a time value of a local clock associated with the network node element; and wherein the time stamp is based on a time value of the local clock plus the first or second time correction factor.

* * * * *